United States Patent
Smith et al.

(10) Patent No.: US 12,411,499 B2
(45) Date of Patent: Sep. 9, 2025

(54) COLLISION PREVENTION FLIGHT CONTROL MODE

(71) Applicant: Lockheed Martin Corporation, Bethesda, MD (US)

(72) Inventors: Anthony J. Smith, Trumbull, CT (US); Navid Tehrani Dadkhah, Providence, RI (US); Michael Gregory Todd, Southington, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 350 days.

(21) Appl. No.: 17/590,203

(22) Filed: Feb. 1, 2022

(65) Prior Publication Data
US 2023/0244249 A1   Aug. 3, 2023

(51) Int. Cl.
*G05D 1/229*   (2024.01)
*G01S 13/933*   (2020.01)
(Continued)

(52) U.S. Cl.
CPC ............ *G05D 1/229* (2024.01); *G01S 13/933* (2020.01); *G01S 17/933* (2013.01);
(Continued)

(58) Field of Classification Search
CPC ........ G01S 13/933–935; G01S 17/933; G05D 1/00; G05D 1/82; B64C 13/00; B64C 27/00
(Continued)

(56) References Cited

U.S. PATENT DOCUMENTS

| | | | |
|---|---|---|---|
| 7,751,976 B2 | 7/2010 | Matuska et al. | |
| 2005/0270224 A1* | 12/2005 | Silberman | G05D 1/0646 |
| | | | 342/65 |

(Continued)

FOREIGN PATENT DOCUMENTS

CN   111722640 A   *   9/2020

OTHER PUBLICATIONS

BA H—English Description of CN-111722640-A via Espacenet Patent Translate, retrieved Feb. 10, 2024. (Year: 2024).*
(Continued)

*Primary Examiner* — Erin M Piateski
*Assistant Examiner* — Paul Allen
(74) *Attorney, Agent, or Firm* — Foley & Lardner LLP

(57) ABSTRACT

Systems and methods for controlling an aerial vehicle to avoid obstacles are disclosed. A system can detect, based on a world model generated from sensor data captured by one or more sensors positioned on the aerial vehicle during flight, an obstacle for the aerial vehicle, and trigger an augmented manual control mode responsive to a speed of the aerial vehicle being less than a predetermined threshold and detecting the obstacle. The system can set, responsive to triggering the augmented manual control mode, a speed constraint for the aerial vehicle in a direction of the obstacle based on a distance between the aerial vehicle and the obstacle. The system can receive an instruction to navigate the aerial vehicle in the direction at a second speed, and adjust the instruction to replace the second speed with the speed constraint, causing the aerial vehicle to navigate at the speed constraint.

18 Claims, 6 Drawing Sheets

(51) Int. Cl.
  *G01S 17/933* (2020.01)
  *G05D 1/246* (2024.01)
  *G05D 1/622* (2024.01)
  *G05D 1/82* (2024.01)
  *G05D 109/25* (2024.01)

(52) U.S. Cl.
  CPC ........... *G05D 1/2469* (2024.01); *G05D 1/622* (2024.01); *G05D 1/82* (2024.01); *G05D 2109/25* (2024.01)

(58) Field of Classification Search
  USPC ....................................................... 701/2–18
  See application file for complete search history.

(56) References Cited

U.S. PATENT DOCUMENTS

| | | | |
|---|---|---|---|
| 2011/0234425 A1* | 9/2011 | Germanetti | G08G 5/045 340/945 |
| 2015/0309513 A1* | 10/2015 | Certain | G05D 1/102 701/11 |
| 2016/0070264 A1 | 3/2016 | Hu et al. | |
| 2016/0125746 A1* | 5/2016 | Kunzi | G01S 7/003 701/11 |
| 2017/0285662 A1* | 10/2017 | Cherepinsky | B64C 13/00 |
| 2017/0315545 A1* | 11/2017 | Li | G01S 19/42 |
| 2017/0323571 A1* | 11/2017 | Lissajoux | G08G 5/0052 |
| 2018/0136669 A1 | 5/2018 | Turpin et al. | |
| 2018/0196435 A1* | 7/2018 | Kunzi | G05D 1/0088 |
| 2019/0317530 A1* | 10/2019 | Yang | G08G 5/0013 |
| 2020/0050184 A1* | 2/2020 | Miao | B64C 19/02 |
| 2020/0209895 A1* | 7/2020 | Wang | G05D 1/106 |
| 2020/0278679 A1* | 9/2020 | Kunzi | G08G 5/0021 |
| 2020/0327814 A1 | 10/2020 | Adolf et al. | |
| 2021/0103300 A1* | 4/2021 | Zhang | G05D 1/12 |
| 2023/0073163 A1* | 3/2023 | Borgyos | G08G 5/20 |
| 2023/0205206 A1* | 6/2023 | Zhang | B64U 20/87 701/3 |

OTHER PUBLICATIONS

Y. Du, X. Zhang and Z. Nie, "A Real-Time Collision Avoidance Strategy in Dynamic Airspace Based on Dynamic Artificial Potential Field Algorithm," in IEEE Access, vol. 7, pp. 169469-169479, 2019, doi: 10.1109/ACCESS.2019.2953946. (Year: 2019).*
Extended European Search Report on European Patent Application No. 23151985.1 dated Jun. 6, 2023 (8 pages).

* cited by examiner

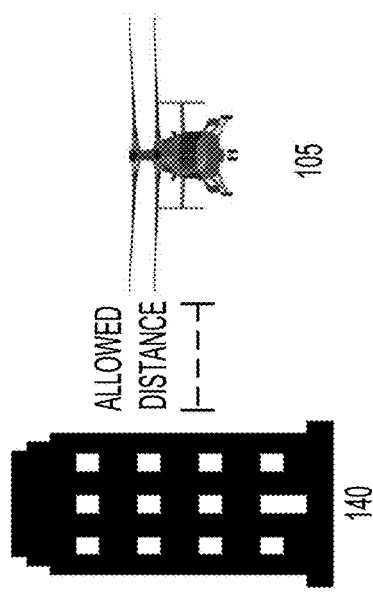
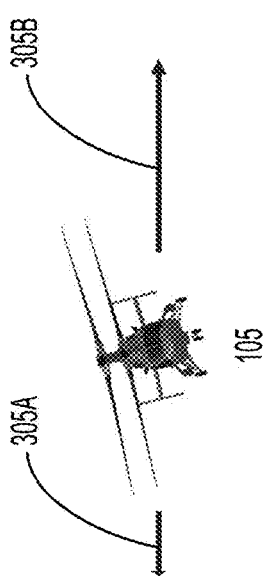
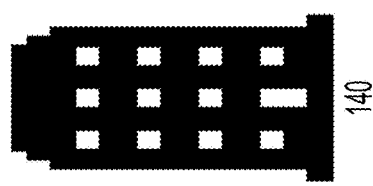
FIG. 3A
FIG. 3B

COLLISION PREVENTION FLIGHT CONTROL MODE

TECHNICAL BACKGROUND

This disclosure relates to augmented manual control mode for an aerial vehicle to avoid collisions such that the aerial vehicle may be navigated close to obstacles.

BACKGROUND

Aerial vehicles, such as vertical takeoff and landing (VTOL) aircraft, can be navigated close to obstacles to complete aerial tasks. It is challenging and hazardous for pilots to navigate such aerial vehicles close to obstacles, however doing so may be unavoidable.

SUMMARY

Pilots of aerial vehicles may be tasked with flying close to one or more obstacles, navigating hazardous pathways, or performing takeoff or landing procedures while positioned close to potential obstacles. These pilots take great care to prevent the aerial vehicle from colliding with obstacles in their environment when performing these hazardous tasks. Because pilots are typically attending to other tasks while flying aerial vehicles, maintaining control over an aerial vehicle while navigating close to environmental obstacles may be unmanageable or generally unsafe.

The systems and methods of this technical solution provide an automatic control mode for an aerial vehicle that engages when a pilot navigates close to obstacles in the environment. The systems and methods described herein leverage existing sensor data positioned on the aircraft, and in some implementations existing world models of the environment, to detect objects that are proximate to the aircraft. If an object is detected, the systems and methods described herein can create a speed constraint for the aircraft in the direction of the object, which prevents the pilot from colliding with the obstacle while allowing the pilot to otherwise freely navigate the aerial vehicle as intended. The speed constraint, and the constrained direction, can be dynamically updated as the aerial vehicle is piloted through the environment. The present techniques provide improvements to the safety and stability of aerial vehicles while navigating near obstacles.

At least one aspect of the present disclosure is directed to a method for controlling an aerial vehicle to avoid obstacles. The method can be performed, for example, by one or more processors coupled to memory of the aerial vehicle. The method can include detecting, based on a world model generated from sensor data captured by one or more sensors positioned on the aerial vehicle during flight, an obstacle for the aerial vehicle. The method can include triggering an augmented manual control mode responsive to a speed of the aerial vehicle being less than a predetermined threshold and detecting the obstacle. The method can include setting, responsive to triggering the augmented manual control mode, a speed constraint for the aerial vehicle in a direction of the obstacle based on a distance between the aerial vehicle and the obstacle. The method can include receiving, via an inceptor of the aerial vehicle, an instruction to navigate the aerial vehicle in the direction at a second speed greater than the speed constraint. The method can include adjusting the instruction to replace the second speed with the speed constraint, to cause the aerial vehicle to navigate in the direction at the speed constraint instead of the second speed.

In some implementations, the one or more sensors can include one or more of a light detection and ranging (LiDAR) sensor, a radar sensor, or a camera. In some implementations, the obstacle can be an along-track obstacle. In some implementations, the method can include detecting a cross-track obstacle for the aerial vehicle in a second direction that is at least partially opposite of the direction. In some implementations, the method can include adjusting a second instruction received via the inceptor of the aerial vehicle to limit a third speed for the aerial vehicle in the second direction, to guide the aerial vehicle between the along-track obstacle and the cross-track obstacle.

In some implementations, adjusting the instruction to navigate the aerial vehicle is further based on one or more attributes of the aerial vehicle. In some implementations, the method can include determining that the distance is less than a predetermined distance threshold. In some implementations, the method can include setting the speed constraint to prevent movement in the direction responsive to determining that the distance is less than the predetermined distance threshold. In some implementations, the method can include providing an alert to a pilot of the aerial vehicle responsive to setting the speed constraint. In some implementations, the alert can be at least one of haptic feedback, an audio alert, or a visual alert presented on a display of the aerial vehicle. In some implementations, the method can include adjusting an inceptor constraint to limit physical movement of the inceptor based on the speed constraint.

In some implementations, the method can include setting, responsive to triggering the augmented manual control mode, an attitude constraint for the aerial vehicle based on the direction to the obstacle and the distance. In some implementations, the method can include adjusting, responsive to receiving a second instruction to change an attitude of the aerial vehicle, the second instruction to replace the change of the attitude with the attitude constraint. In some implementations, the method can include setting, responsive to triggering the augmented manual control mode, a vertical acceleration constraint for the aerial vehicle based on the direction to the obstacle and the distance. In some implementations, the method can include adjusting, responsive to receiving a second instruction to change a vertical acceleration of the aerial vehicle, the second instruction to replace the change of the vertical acceleration with the vertical acceleration constraint. In some implementations, setting the speed constraint for the aerial vehicle can include setting a respective speed constraint for each of an x-axis direction, a y-axis direction, and a z-axis direction.

At least one other aspect of the present disclosure is directed to a system for controlling an aerial vehicle to avoid obstacles. The system can include, for example, one or more processors coupled to memory of the aerial vehicle. The system can detect, based on a world model generated from sensor data captured by one or more sensors positioned on the aerial vehicle during flight, an obstacle for the aerial vehicle. The system can trigger an augmented manual control mode responsive to a speed of the aerial vehicle being less than a predetermined threshold and detecting the obstacle. The system can set, responsive to triggering the augmented manual control mode, a speed constraint for the aerial vehicle in a direction of the obstacle based on a distance between the aerial vehicle and the obstacle. The system can receive, via an inceptor of the aerial vehicle, an instruction to navigate the aerial vehicle in the direction at a second speed greater than the speed constraint. The system can adjust the instruction to replace the second speed with the speed constraint, to cause the aerial vehicle to navigate in the direction at the speed constraint instead of the second speed.

In some implementations, the one or more sensors can include one or more of a LiDAR sensor, a radar sensor, or a camera. In some implementations, the obstacle can be an along-track obstacle. In some implementations, the system can detect a cross-track obstacle for the aerial vehicle in a second direction that is at least partially opposite the direction. In some implementations, the system can adjust a second instruction received via the inceptor of the aerial vehicle to limit a third speed for the aerial vehicle in the second direction, to guide the aerial vehicle between the along-track obstacle and the cross-track obstacle. In some implementations, the system can adjust the instruction to navigate the aerial vehicle further based on one or more attributes of the aerial vehicle.

In some implementations, the system can determine that the distance is less than a predetermined distance threshold. In some implementations, the system can set the speed constraint to prevent movement in the direction responsive to determining that the distance is less than the predetermined distance threshold. In some implementations, the system can provide an alert to a pilot of the aerial vehicle responsive to setting the speed constraint, wherein the alert is at least one of haptic feedback, an audio alert, or a visual alert presented on a display of the aerial vehicle. In some implementations, the system can adjust an inceptor constraint to limit physical movement of the inceptor based on the speed constraint.

In some implementations, the system can set, responsive to triggering the augmented manual control mode, an attitude constraint for the aerial vehicle based on the direction to the obstacle and the distance. In some implementations, the system can adjust, responsive to receiving a second instruction to change an attitude of the aerial vehicle, the second instruction to replace the change of the attitude with the attitude constraint. In some implementations, the system can generate the world model based on the sensor data captured by the one or more sensors positioned on the aerial vehicle. In some implementations, the system can set the speed constraint for the aerial vehicle by setting a respective speed constraint for each of an x-axis direction, a y-axis direction, and a z-axis direction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks or other non-transitory storage media) or intangible carrier media (e.g. communication signals). Aspects may also be implemented using suitable apparatus, which may take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 3A and 3B illustrate example diagrams showing various constraints that can be applied to the motion of an aerial vehicle, in accordance with one or more implementations;

DETAILED DESCRIPTION

Figure 1:
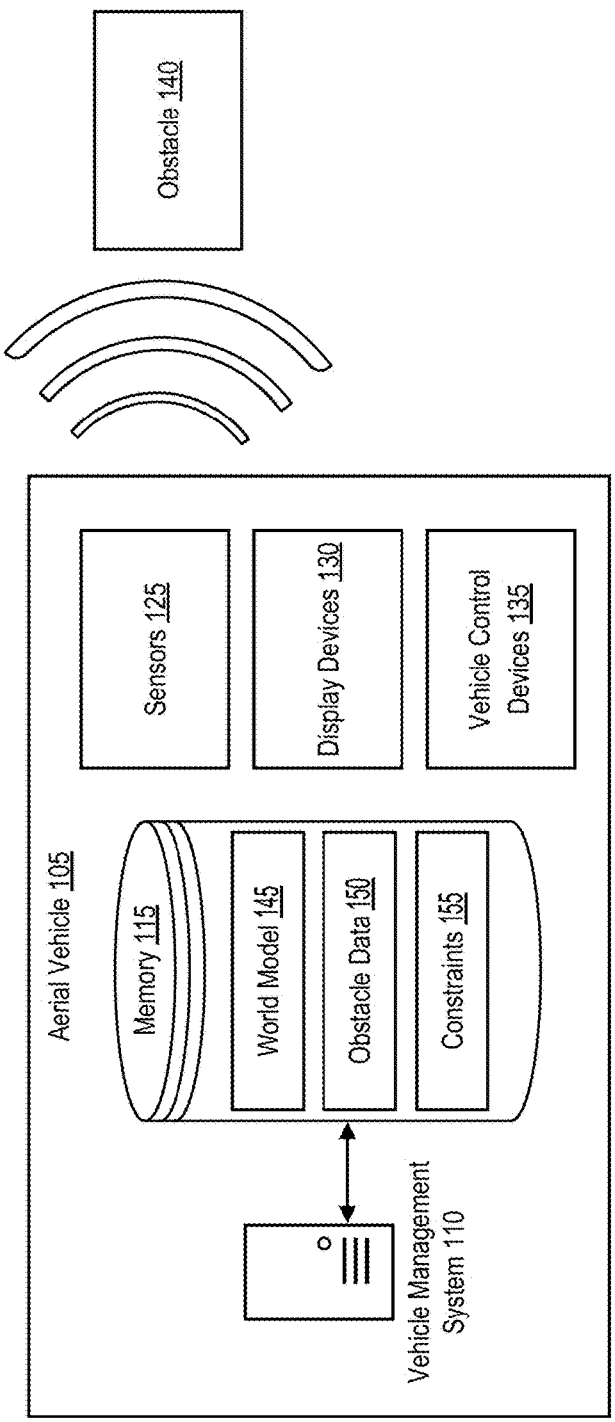
FIG. 1 is a illustrates a block diagram of a system for controlling an aerial vehicle to avoid obstacles, in accordance with one or more implementations.

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations may be utilized, and other changes may be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For purposes of reading the description of the various embodiments below, the following descriptions of the sections of the specification and their respective contents may be helpful:

Section A describes systems, apparatuses, and methods for controlling an aerial vehicle to avoid obstacles; and Section B describes a computer system to be used in implementing various components described herein.

A. Controlling an Aerial Vehicle to Avoid Obstacles

The systems, apparatuses, and methods described herein allow for augmented manual control modes for aerial vehicles, which allow pilots to safely navigate aerial vehicles close to obstacles. In many types of aerial missions or tasks, a pilot may operate an aerial vehicle in close proximity to obstacles in the environment. The techniques described herein can automatically impose constraints on manual input provided by pilots when an aerial vehicle is close to obstacles.

Obstacles can be detected by leveraging existing sensor systems that are positioned on the aerial vehicles. Such on-aircraft sensor systems can include light detection and ranging (LiDAR), visible light, infrared light sensors, accelerometers, gyroscopes, magnetometers, or any other sensor that is capable of detecting objects or a status of the aerial vehicle in the environment. Using these sensors, information from the surrounding environment can be continually retained and updated as part of a comprehensive world model within the memory of the aerial vehicle. The systems and methods described herein can then use this world model to determine the distance and direction from the aerial vehicle to proximate objects.

For example, the systems and methods described herein can automatically assign a speed constraint for a particular direction based on the position of a detected obstacle relative to the position of the aerial vehicle. When a pilot attempts to navigate the aerial vehicle in the direction of the obstacle at a speed that exceeds the constraint, the systems and methods described herein can automatically adjust the instruction to conform to the constraint. Constraints other than speed, such as attitude (e.g., roll, pitch, and yaw) constraints or vertical acceleration constraints may also be implemented. By constraining the movement of the aerial vehicle in the direction of obstacles, the systems and methods described herein allow pilots to navigate freely in other directions while protecting the aerial vehicle in the event of a potentially hazardous input.

The motion constraints imposed on the aerial vehicle can be updated over time, allowing pilots to slowly and safely approach obstacles without resulting in a collision. This allows for the completion of missions or tasks in which the aerial vehicle is in close proximity to objects in the environment without completely constraining manual movement input, and without requiring the pilot to continuously perform the high-workload task of managing vehicle position with respect to obstacles while engaging in other activities. The systems and methods described herein therefore provide improvements to conventional aerial vehicle control systems by providing an augmented manual control mode, which can allow aerial vehicles to be safely navigated close to obstacles in an environment without restricting other movement commands. These and other improvements are detailed herein.

Referring now to FIG. 1, illustrated is a block diagram of an example system 100 for controlling an aerial vehicle to avoid obstacles, in accordance with one or more implementations. In brief overview, the system 100 can include at least one aerial vehicle 105 and one or more obstacles 140. The aerial vehicle 105 can include at least one vehicle management system 110, at least one memory 115, one or more sensors 125, one or more display devices 130, and one or more vehicle control devices 135. The memory 115 can store at least one world model 145, obstacle data 150, and one or more constraints 155. The vehicle management system 110, the memory 115, the sensors 125, the display devices 130, and the vehicle control devices 135 may be connected or communicatively coupled with one another. The vehicle management system 110, the memory 115, the sensors 125, the display devices 130, and the vehicle control devices 135 may be implemented at least in part using one or more of the components of the computer system 600 described in connection with Section B.

The aerial vehicle 105 can be any type of aerial vehicle, such as a helicopter, a drone, a vertical take-off and landing (VTOL) aircraft, or any other type of aerial vehicle. The aerial vehicle 105 can be operated by one or more pilots, for example, using the vehicle control devices 135. The aerial vehicle 105 can be dispatched to address one or more remote issues by completing one or more assigned tasks, which may be performed in close proximity to environmental obstacles. Such assigned tasks can include, for example, combat tasks or taking off or landing in precarious environments, such as oil rigs. The aerial vehicle 105 may be equipped with any type of device or system that may be used to complete a task or mission that has been assigned to the aerial vehicle. The aerial vehicle may include one or more communications interfaces (not pictured), via which the aerial vehicle 105 or the vehicle management system 110 may transmit information, including any of the information used in the techniques described herein. For example, the aerial vehicle 105 may communicate the obstacle data 150 or the constraints 155 to one or more remote devices (not pictured), which may include other aerial vehicles or computing systems in communication with the aerial vehicle 105.

The sensors 125 can be mounted on the interior or the exterior of the aerial vehicle 105. Non-limiting examples of the sensors 125 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 125 by the vehicle management system 110. In some implementations, one or more of the sensors 125 can provide sensor data periodically (e.g., in a batch transmission, etc.) to the vehicle management system 110. In some implementations, one or more of the sensors 125 can provide sensor data to the vehicle management system 110 upon receiving a corresponding request for sensor data from the vehicle management system 110.

The display devices 130 can include any type of device capable of presenting information to a pilot (not pictured) that operates the aerial vehicle 105. The display devices 130 can be positioned within the aerial vehicle 105 such that they can be viewed while the pilot is operating the aerial vehicle 105. The display devices 130 can include devices that present specific sensor information, such as speed, direction, velocity, or location. The display devices 130 can also be general display devices that can present information used in the techniques described herein, such as the obstacle data 150 or the constraints 155. The display devices 130 can include an electronic flight instrument system (EFIS), which can include one or more primary flight displays, one or more multi-function displays, or other displays. Types of display devices can include liquid crystal displays (LCDs), light-emitting diode (LED) displays, organic light-emitting diode (OLED) displays, bi-stable displays (e.g., e-ink, etc.), among others. As described herein, the vehicle management system 110 may present alerts or other information related to the constraints 155 or an indication an augmented manual control mode being activated.

The vehicle control devices 135 can be any type of control device that is capable of maneuvering the aerial vehicle 105. Some non-limiting examples of the vehicle control devices 135 can include inceptors, cyclic controls, collective levers, pedals, throttles, VTOL unmanned aerial vehicle (UAV) controls, or any other type of aerial vehicle control device. The vehicle control devices 135 can be operated by a pilot of the aerial vehicle to send navigation or maneuver instructions to the vehicle management system, which can change the speed, attitude, or vertical acceleration of the aerial vehicle 105 according to the constraints 155. In implementations where the aerial vehicle is a UAV, the vehicle control devices 135 (and in some implementations, components of the vehicle management system 110) may be remote from the aerial vehicle 105, and may communicate flight commands to the aerial vehicle 105 to maneuver the aerial vehicle 105 according to pilot instructions. The vehicle control devices 135 may include haptic feedback devices that indicate one or more alerts to the pilot, such as alerts that an augmented manual control mode has been triggered, or alerts that the maneuverability of the vehicle has been limited according to one or more of the constraints 155. The vehicle control devices 135 can include configurable (e.g., configurable by the vehicle management system 110, etc.) actuators that prevent physical movement of the vehicle control devices 135 according to the constraints 155. For example, the vehicle control devices 135 may include actuators that prevent physical movement of the vehicle control devices 135 in directions, or at magnitudes, that would cause the aerial vehicle 105 to exceed one or more of the constraints 155.

The memory 115 can be a computer-readable memory that can store or maintain any of the information described herein. The memory can maintain one or more data structures, which may contain, index, or otherwise store each of the values, pluralities, sets, variables, vectors, numbers, or thresholds described herein. The memory 115 can be accessed using one or more memory addresses, index values, or identifiers of any item, structure, or region maintained in the memory 115. The memory 115 can be accessed by the vehicle management system 110. In some implementations, other computing devices present on the aerial vehicle 105 can access the memory 115. The vehicle management system 110 can store the results of any or all computations in one or more data structures in the memory 115, such that the data structures are indexed or identified with appropriate values for later access.

Figure 4B:
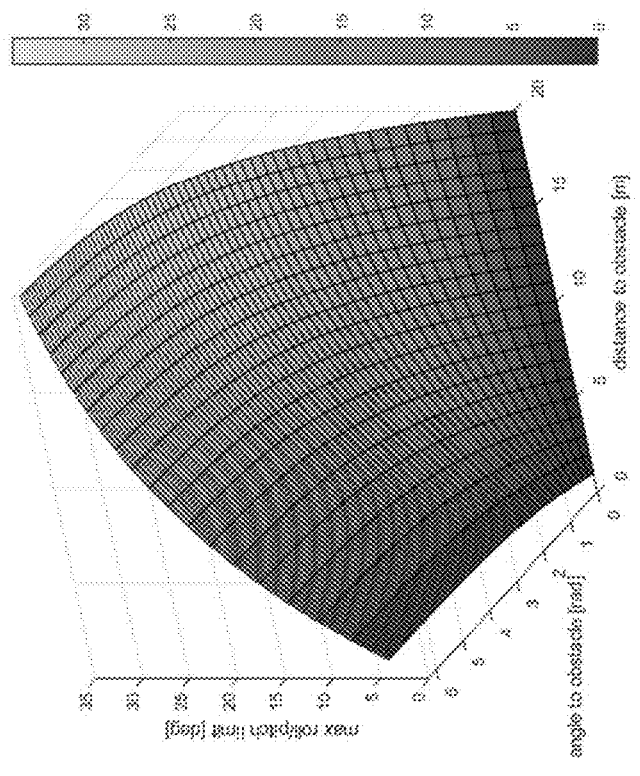
FIGS. 4A and 4B illustrate example plots of a distance field of obstacles and control axis limits, respectively, in accordance with one or more implementations.
Figure 4A:
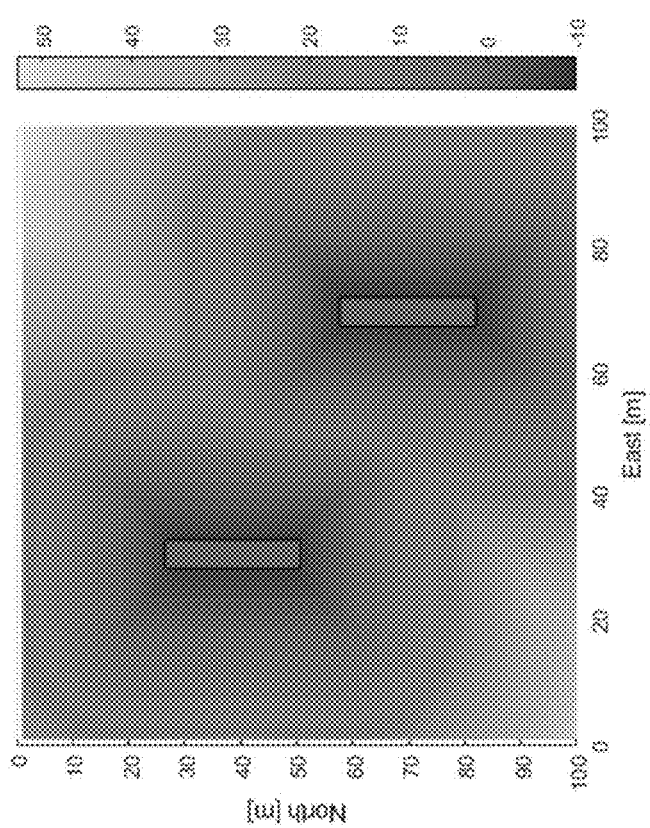

The memory 115 can store a world model 145, for example, in one or more data structures. The vehicle management system 110 can retrieve sensor data from the sensors 125 to generate the world model 145. The world model 145 can be a collection of related sensor information that models the environment surrounding the aerial vehicle. An example plot of a distance field of obstacles, which may be part of the world model 145, is shown in FIG. 4A. The sensor information in the world model 145 can be stored in association with one or more timestamps, identifying the time the sensors 125 captured the particular sensor information. The world model 145 can be used by the vehicle management system 110 to detect the distance between the aerial vehicle 105 and one or more obstacles 140, as well as a direction from the aerial vehicle 105 to the one or more obstacles 140. The world model 145 can include a corresponding record of one or more obstacles in the environment surrounding the aerial vehicle 105. The world model 145 may also include collection of different collections of sensor data that represent the environment surrounding the aerial vehicle, including height maps, temperature maps, red-green-blue (RGB) channels (e.g., from visible light cameras), terrain information, weather information, or visibility information, among any other type of sensor data. The world model 145 can be iteratively updated by the vehicle management system 110 as additional sensor information is captured and processed by the vehicle management system 110. One or more portions of the world map 145 may be presented to the pilot via the display devices 130.

The memory 115 can store obstacle data 150, for example, in one or more data structures. The obstacle data may be stored by the vehicle management system 110 upon detecting an obstacle 140 based on the sensor data in the world model 145. The obstacle data 150 can be a corresponding record of information used in the techniques described herein for each obstacle. For example, the obstacle data 150 can include a position of an obstacle 140, a direction that, if traveled by the aerial vehicle 105, would eventually result in a collision between the obstacle 140 and the aerial vehicle 105, a distance between the aerial vehicle 105 and the obstacle 140, a classification of the obstacle data 150, or any other information about an obstacle 140 that may be derived from the data produced by the sensors 125. In some implementations, the obstacle data 150 may include velocity or acceleration data for one or more obstacles 140, for example, if the obstacle 140 is a moving object. Corresponding obstacle data 150 may be stored and updated for each obstacle 140 detected from the world model 145.

The memory 115 can store one or more constraints 155, for example, in one or more data structures. The constraints 155 may be any type of constraint that may be applied to one or more maneuvers performed by the aerial vehicle 105 during its operation. One example of a constraint 155 includes a speed constraint, which may constrain the speed of the aerial vehicle 105 in a particular direction, as determined by the vehicle management system 110. Another type of constraint 155 may be an attitude (e.g., roll, pitch, or yaw, etc.) constraint (or an attitude rate constraint), which constrains rotational motion (which through operation of the aerial vehicle, may translate to translational motion in the environment) of the aerial vehicle 105. Another example of a constraint is a vertical acceleration or vertical movement constraint. Such constraints may limit vertical movement speed of the aerial vehicle 105. One or more constraints 155 may be implemented at the same time to limit multiple aspects of the movement of the aerial vehicle 105. For example multiple speed constraints may be active if the aerial vehicle is flying between two obstacles 140. Similarly, in some implementations, both an attitude and a speed constraint may be implemented at the same time. Other combinations of multiple constraints 155 are also contemplated, and any combination of constraints 155 may be generated, updated, or used, as described herein. The vehicle management system 110 may create, update, and remove the constraints 155 to limit movement of the aerial vehicle 105, as described herein. An example plot showing a range of attitude constraints for the aerial vehicle for various angles and distances is shown in FIG. 4B.

The obstacle 140 can be any type of obstacle that may be encountered or observed when piloting an aerial vehicle. Obstacles 140 may be static, or non-moving, obstacles, such as terrain, buildings, or other stationary objects. In some implementations, one or more of the obstacles may be moving obstacles, such as other aerial vehicles, or other dynamic, or moving, obstacles. Properties or characteristics of the obstacles 140 may be captured by the sensors 125, and stored as part of corresponding obstacle data 150 in the memory 115.

The vehicle management system 110 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The vehicle management system 110 can communicate with any of the components of the aerial vehicle 105, including the memory 115, the sensors 125, the display devices 130, and one or more communication interfaces (not pictured), to perform the operations described herein. The vehicle management system 110 can include any or all of the components and perform any or all of the functions of the computer system 600 described in connection with FIG. 6.

Referring now to the operations of the vehicle management system 110, the vehicle management system 110 can detect, based on the world model 145 generated from sensor data captured by one or more sensors 125 positioned on the aerial vehicle 105 during flight, an obstacle 140 for the aerial vehicle 105. The sensor data captured by the sensors 125 may be used to generate the world model 145, which may include generating one or more distance fields, such as the example distance field represented in the plot shown in FIG. 4A. A distance field can be a multidimensional field where a value at each point is equal to a distance from a nearest obstacle 140. Gradients in a distance field may be used to determine a direction to the nearest obstacle 140 relative to the aerial vehicle 105. Using the sensor data, such as data captured from proximity sensors, cameras, or LiDAR sensors (e.g., the sensors 125), the vehicle management system 110 can detect one or more obstacles 140 in the environment as the aerial vehicle 105 is operated. In some implementations, multiple objects may be detected. In such implementations, multiple directions between each of the obstacles 140 relative to the obstacles 140 may be determined. For example, using the position of the aerial vehicle 105 in the world model, and the determined position of the aerial vehicle 105 in the world model, the vehicle management system 110 can calculate a direction of a vector in three-dimensional space (e.g., using Euclidean vector functions) from the aerial vehicle 105 to the position of the object. In some implementations, the vehicle management system 110 can calculate the direction based on one or more gradients in a distance field. The distance from the aerial vehicle 105 to the detected objects can be calculated using similar operations. The direction to the obstacle 140 and the distance (e.g., Euclidean distance or distance using other coordinate systems) to the obstacle 140 can be stored as part of the obstacle data 150 for that obstacle 140.

The vehicle management system 110 can trigger an augmented manual control mode responsive to a speed of the aerial vehicle being less than a predetermined threshold and detecting the obstacle 140. The techniques described herein may operate when the aerial vehicle 105 is navigating at less than a predetermined speed. The predetermined speed may be based on the capabilities (e.g., attributes) of the aerial vehicle 105 (e.g., top speed, maneuverability, turn coordination speed limit, etc.). To determine whether the speed of the aerial vehicle 105 is less than the threshold, the vehicle management system 110 can access one or more vehicle sensor readings that provide vehicle status information, such as aerial vehicle 105 acceleration and aerial vehicle 105 speed, among others. The vehicle management system 110 can compare the current speed of the aerial vehicle 105 to the predetermined threshold. If the speed of the aerial vehicle 105 is less than the predetermined threshold, the method can proceed to trigger the augmented manual control mode. Otherwise, the augmented manual control mode can remain deactivated.

The augmented manual control mode can be a configuration setting of the vehicle management system 110 that indicates that the vehicle management system 110 can perform the techniques described herein to limit the maneuverability of the aerial vehicle 105 while operating close to obstacles 140 in the environment. When the augmented manual mode is triggered (or otherwise initiated) by the vehicle management system 110, commands that are input by the pilot are adjusted, or augmented, based on the distance of the aerial vehicle 105 to obstacles in the environment. This augmented manual control mode allows for the pilot to maintain control over the aerial vehicle 105, even when navigating close to obstacles 140. However, the inputs provided by the pilot may be modified according to constraints 155 established in the direction of any detected obstacles 140. To trigger the augmented manual control mode, the vehicle management system 110 can modify a data structure in the memory of the vehicle management system 110 that indicates the augmented control mode is enabled. The augmented manual control mode, if triggered, can cause the vehicle management system 110 to perform the further steps of the method 500. As described herein, the augmented manual control mode can limit pilot-input changes to speed, attitude (e.g., roll, pitch, yaw), attitude rate (e.g., roll rate, pitch rate, or yaw rate), or vertical acceleration of the aerial vehicle 105 in the direction of obstacles 140 in the environment, according to the constraints 155. In some implementations, if the speed of the vehicle exceeds the predetermined threshold after triggering the augmented manual control mode, the vehicle management system 110 can deactivate the augmented manual control mode by modifying the data structure in the memory of the vehicle management system 110. Once the augmented manual control mode has been triggered, the vehicle management system 110 can perform further operations described herein to limit the maneuverability of the aerial vehicle according to the constraints 155.

The vehicle management system 110 can set, responsive to triggering the augmented manual control mode, a constraint 155 for the aerial vehicle 105 (e.g., a speed constraint, an attitude constraint, attitude rate constraint, a vertical acceleration constraint, etc.) in a direction of the obstacle 140 based on a distance between the aerial vehicle 105 and the obstacle 140. The direction and distance (e.g., Euclidean distance or angular distance) to the obstacle 140 can be retrieved from the corresponding obstacle data 150. The speed constraint 155 may be stored in one or more data structures in the memory of the vehicle management system 110 (e.g., the constraints 155, etc.). As described herein, the vehicle management system 110 can detect both a distance between detected objects in the environment and the aerial vehicle 105 and a direction that, if traveled by the aerial vehicle 105, would result in a collision between the aerial vehicle 105 and the obstacle 140. The vehicle management system 110 may detect multiple obstacles 140 in the environment from the world model, and subsequently set multiple constraints 155 (e.g., one or more constraints 155 for each obstacle 140) for the aerial vehicle 105.

The constraints 155 may be set by identifying one or more control limits for movement of the aerial vehicle 105, and subsequently setting a constraint 155 for those control limits. For example, if the constraint 155 is a speed constraint 155, the vehicle management system 110 can set corresponding speed constraints 155 for the aerial vehicle 105 in the direction of the obstacle 140. To set a constraint 155 for the aerial vehicle 105, the vehicle management system 110 can apply a function, such as an exponential function or another type of function, to the distance between the aerial vehicle 105 and the obstacle 140. This function can be a function having an output that decreases exponentially as the distance between the obstacle 140 and the aerial vehicle 105 also decreases. Similarly, the function may also use the current orientation (e.g., angle or attitude of the aerial vehicle 105) as input, such that the output of the function also decreases as the angle to the obstacle 140 decreases.

An example plot of such a function for a maximum roll/pitch constraint 155 for the aerial vehicle 105 is shown in FIG. 4B. As shown in FIG. 4B, when the angle of the aerial vehicle 105 to the obstacle 140 or the distance between the aerial vehicle 105 to the obstacle 140 decreases, the maximum allowable limit (e.g., the constraint 155) also decreases in value. Although this plot is shown for a pitch/roll constraint 155, it should be understood that such constraints 155 may be generated using similar functions with similar limits for the speed, attitude, attitude rate, vertical acceleration, or component vectors thereof. The parameters (e.g., weights, coefficients, etc.) of the function used to calculate the constraint 155 may be selected based on capabilities (e.g., attributes) of the aerial vehicle 105. For example, different aerial vehicles with different maneuvers, turn coordination speed limits, or abilities may utilize different functions, which may be predetermined or selected to optimize the safety of the aerial vehicle 105 while navigating close to obstacles 140 in the environment. The vehicle management system 110 can set the constraint 155 for the speed, attitude, attitude rate, or vertical acceleration of the aerial vehicle 105 by providing the distance and attitude of the aerial vehicle 105 into the function to generate a constraint 155 value. Then, the aerial vehicle 105 can update one or more data structures in the memory of the vehicle management system 110 with the constraint 155 value, which can be stored in association with the corresponding direction. Then, when the aerial vehicle 105 receives a command to navigate in the direction (or partially along the direction), the vehicle management system 110 can utilize the constraint 155 to limit the movement of the aerial vehicle 105 according to the constraint 155 to maintain a safe distance between the aerial vehicle 105 and the detected obstacle 140.

In some implementations, the vehicle management system 110 can decompose the direction vector to the obstacle 140 from the aerial vehicle 105 into component (e.g. x, y, and z vectors) vectors, and set a corresponding speed constraint 155 for the aerial vehicle 105 in the direction of each component vector. The direction from the aerial vehicle 105 to the obstacle 140 can be represented in an inertial coordinate frame (e.g., along track, cross-track, etc.). However, the constraints 155 for the aerial vehicle 105 are represented in the body frame of reference (e.g., the frame of reference relative to the aerial vehicle). Therefore, in some implementations, the vehicle management system 110 can transform the inertial frame of reference to the vehicle frame of reference to calculate the proper component constraint 155 for each corresponding body axis of the aerial vehicle 105. Similar decomposition techniques may be utilized for the attitude of the aerial vehicle 105, by decomposing the direction into corresponding roll, pitch, and yaw rotation of the aerial vehicle 105. Corresponding constraints 155 can then be set for each of the component roll, pitch, and yaw rotations, according to the constraint 155 value calculated based on the distance or angle of the aerial vehicle 105 to the obstacle 140. In some implementations, the aerial vehicle 105 may set a stop constraint 155 for an obstacle 140 if the vehicle management system 110 determines that the aerial vehicle 105 is within a predetermined distance of the obstacle 140. For example, if the aerial vehicle 105 is within the predetermined distance of the obstacle 140, the vehicle management system 110 can set a constraint 155 to prevent movement of the aerial vehicle 105 in the direction of the obstacle 140.

In some implementations, upon setting a constraint 155 for the aerial vehicle 105, the vehicle management system 110 can provide an alert to the pilot. The alert can be provided using any suitable alert device, such as an audio alert device, a visual alert device, or another device present in the aerial vehicle 105, such as the display device 130. In some implementations, the alert may be haptic feedback created by sending a signal to an actuator in the vehicle control devices 135 of the aerial vehicle 105. The intensity of the haptic feedback, or the alerts described herein, may be proportional to the amount by which the movement of the aerial vehicle 105 is constrained. The alerts may be provided to the pilot when instructions are adjusted by the vehicle management system 110 or when one or more constraints 155 are set.

The vehicle management system 110 can receive, via the aerial vehicle control devices 135 (e.g., an inceptor, etc.) of the aerial vehicle 105, an instruction to navigate the aerial vehicle 105 in the direction to the obstacle 140 at a second speed greater than the speed constraint. As the vehicle management system 110 updates constraints for the aerial vehicle 105, the pilot of the aerial vehicle 105 can send instructions to navigate the aerial vehicle 105 close to obstacles in the environment. As described herein, the vehicle control devices 135 can be used by a pilot to send instructions to navigate the aerial vehicle 105 at different speeds, different attitudes, different attitude rate, or different vertical accelerations. The instructions provided by the vehicle control devices can be received by the vehicle management system 110 via one or more communications interfaces, and subsequently applied to the constraints 155. For example, if the vehicle management system 110 determines that a constraint 155 has been set for a particular direction toward which the pilot is attempting to maneuver the aerial vehicle 105, the vehicle management system 110 can proceed to adjust the instruction according to the corresponding constraint 150. If no constraints 155 are set, or if the aerial vehicle 105 is navigated in a direction that is not associated with a constraint 150, the vehicle management system 110 can maneuver the aerial vehicle 105 according to the instruction without adjustment. These techniques therefore allow the pilot to maintain manual control over the aerial vehicle 105, while having the flexibility to safely navigate the aerial vehicle 105 close to obstacles without significant effort.

The vehicle management system 110 can adjust the instruction to replace the second speed with the speed constraint 155. This can cause the aerial vehicle 105 to navigate in the direction toward the obstacle 140 at the speed constraint 155 instead of the second speed. As described herein, the vehicle control devices 135 of the aerial vehicle 105 can be operated by a pilot to provide one or more maneuver instructions to the aerial vehicle 105. Some examples of the maneuver instructions include a change to a speed of the aerial vehicle 105 in a specified direction, a change in orientation (e.g., attitude) of the aerial vehicle 105, change in attitude rate, or a change in vertical acceleration of the aerial vehicle 105. The instructions can be provided to the vehicle management system 110, which can determine whether the instruction should be modified according to one or more constraints 155. The vehicle management system 110 can access one or more data structures in the memory of the vehicle management system 110 to determine whether any constraints 155 are set. If a constraint 155 is set, the vehicle management system 110 can compare the instructions received from the vehicle control devices to the limitations imposed in the constraint 155. If the vehicle management system 110 determines that instruction exceeds the constraint 155 (e.g., whether a speed instruction in a particular direction exceeds the speed constraint 155 in that direction, etc.), the vehicle management system 110 can replace the speed in the instruction along the direction with the speed constraint 155.

In some implementations, the vehicle management system 110 can limit instructions according to more than one constraint 155. The vehicle management system 110 can adjust constraints 155 in multiple directions, for example, to navigate the aerial vehicle 105 between two detected obstacles 140. Similarly, the vehicle management system 110 can simultaneously adjust instructions to limit both rotation changes (e.g., attitude changes), attitude rate, and speed changes in the same instruction. In some implementations, the vehicle management system 110 can generate and provide one or more signals to a vehicle control device, such as an inceptor of the aerial vehicle 105, that limit physical movement of the inceptor based on the speed constraint 155. The signal can be provided to an actuator of the vehicle control device that limits the movement the vehicle control device in the direction of the constraint 155. The constraints 155 for changes in the attitude, or attitude rate of the aerial vehicle 105 or vertical acceleration of the vehicle can be used by the vehicle management system 110 to adjust maneuver instructions, by replacing the corresponding attitude or vertical acceleration changes with corresponding constraints 155 when the instruction exceeds the value specified in the constraint 155. In some implementations, the vehicle management system 110 can replace decomposed portions of movement instructions, such as x, y, or z axis movement, or roll, yaw, or pitch rotation, with corresponding decomposed constraint 155 values, as described herein. When constraints 155 are updated by the vehicle management system 110 as the aerial vehicle 105 navigates the environment, the vehicle management system 110 can update the amounts by which instructions are adjusted, allowing the aerial vehicle 105 to be safely navigated by a pilot near obstacles 140 while conducting aerial tasks.

Figure 2:
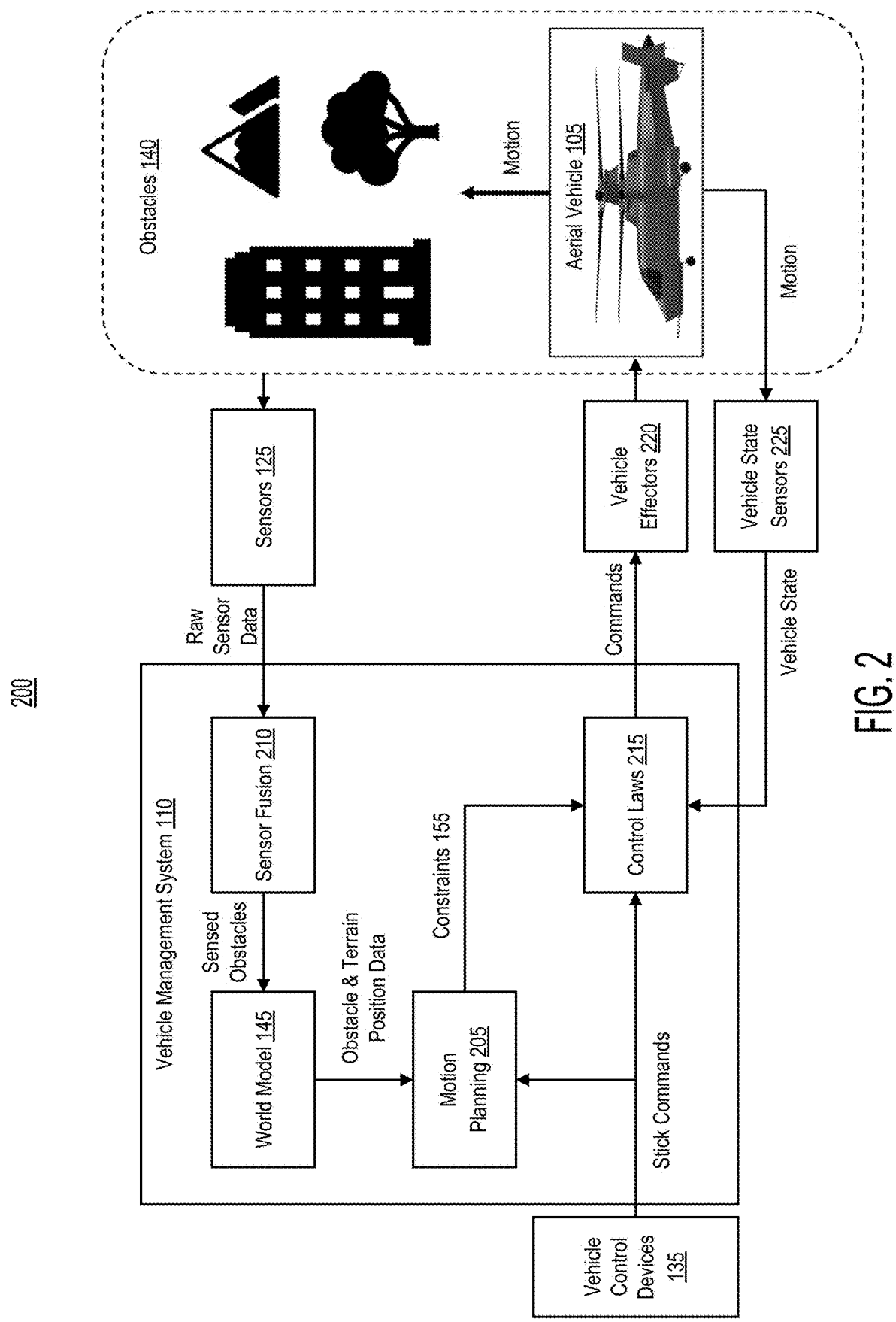
FIG. 2 illustrates a data flow diagram including a vehicle management system of an aerial vehicle that is used to avoid obstacles, in accordance with one or more implementations.

Referring to FIG. 2, and others, illustrated is a data flow diagram 200 including the vehicle management system 110 of the aerial vehicle 105 described in connection with FIG. 1, in accordance with one or more implementations. As shown in the data flow diagram 200, the vehicle management system 110 can receive sensor data (shown as "Raw Sensor Data") from the sensors 125, as described herein. This sensor data may be captured from the obstacles 140 in the environment that is external to the aerial vehicle 105. The vehicle management system 110 can generate the world model 145 by performing sensor fusion logic 210, which may be implemented to generate one or more distance fields, such as the distance fields shown in FIG. 4A. The sensor fusion logic 210 can be software or a combination of hardware and software that can generate the world model 145, and store the world model 145 in the memory 115 (not pictured) of the aerial vehicle 105.

The obstacle and terrain position data (e.g., the obstacle data 150, etc.) can then be provided as input to one or more motion planning algorithms 205 executing on the vehicle management system 210. The motion planning algorithms 205 can be algorithms that, at least in part, carry out the techniques described herein. The motion planning algorithms 205 can include software or a combination of hardware and software that can set one or more of the constraints 155, as described herein. The motion planning algorithms 205 may also receive one or more input commands (e.g., the stick commands) from the vehicle control devices 135, which may in some implementations be used when setting the constraints 155. The constraints 155 may be implemented as part of the control laws 215 to limit the amount by which the instructions from the vehicle control devices 135 can maneuver the aerial vehicle 105. The control laws 215 may also receive information about the vehicle state, which may include position, velocity, acceleration, and attitude data from the vehicle state sensors 225. The vehicle state sensors 225 can be one or more of the sensors 125 that provide information about the state of the aerial vehicle 105.

The control laws 215 can apply the constraints 155 to the instructions received from the vehicle control devices 135 to generate one or more commands for the vehicle effectors 220. The vehicle effectors can be any type of device that is capable of changing the position, velocity, acceleration, or attitude of the aerial vehicle 105. The commands, which may include adjustments based on the constraints 155 as described herein, can cause the aerial vehicle 105 to be navigated close to obstacles 140 without requiring large amounts of pilot workload. Doing so can preserve the mission intent of pilots for operations or tasks such as terrain masking, while gradually easing the aerial vehicle 105 into a desired position near obstacles, rather than swerving the aerial vehicle away, as in other approaches.

FIGS. 3A and 3B illustrate example diagrams showing various constraints that can be applied to the motion of an aerial vehicle, in accordance with one or more implementations. FIG. 3A shows arrows 305A and 305B which represent the allowable motion of the aerial vehicle 105 according to constraints set based on detected obstacles 140. As shown, the arrow 305A, which is in the direction of the obstacle 140, represents the limited movement of the aerial vehicle 105 in the direction of the obstacle 140 as the aerial vehicle approaches the obstacle. In contrast, the arrow 305B, which is not in the direction of any obstacle, is much larger than the arrow 305A, representing unconstrained motion limits of the aerial vehicle away from obstacles 140. FIG. 3B shows that when the aerial vehicle 105 is within the minimum allowed distance toward an obstacle 140, the motion of the aerial vehicle 105 in the direction of the obstacle is prevented. Although not explicitly shown in FIG. 3B, it should be understood that motion in directions that are away from obstacles 140 are not constrained.

FIGS. 4A and 4B illustrate example plots of a distance field of obstacles 400A and control axis limits 400B, respectively, in accordance with one or more implementations. FIG. 4A shows an example distance field, which may be included in the world model 145 described in connection with FIG. 1. In these figures, the pink rectangles are obstacles, and the color bars show a range from the minimum to the maximum distance to the pink obstacles. The distance field can be a two-dimensional or three-dimensional field of values, where each value in the field is equal to a distance to the closest obstacle. Gradients in the distance field can be used to determine the directions to the closest obstacle from any point in the distance field. FIG. 4B shows an example representation of a function that calculates constraints for a maximum pitch/roll of an aerial vehicle. The function can receive both distance and angle to a detected obstacle as input, and can provide a corresponding output value which is equal to the maximum allowable roll/pitch of the aerial vehicle. As shown, as the distance or angle to the obstacle decreases, the allowable range of maximum pitch/roll values also decreases to zero. Likewise, as the distance or angel to the obstacle increases, the allowable range of maximum pitch roll values for the aerial vehicle also increases. The function can be a non-linear function, such that the motion of the aerial vehicle slows down exponentially as the aerial vehicle approaches the obstacle.

Figure 5:
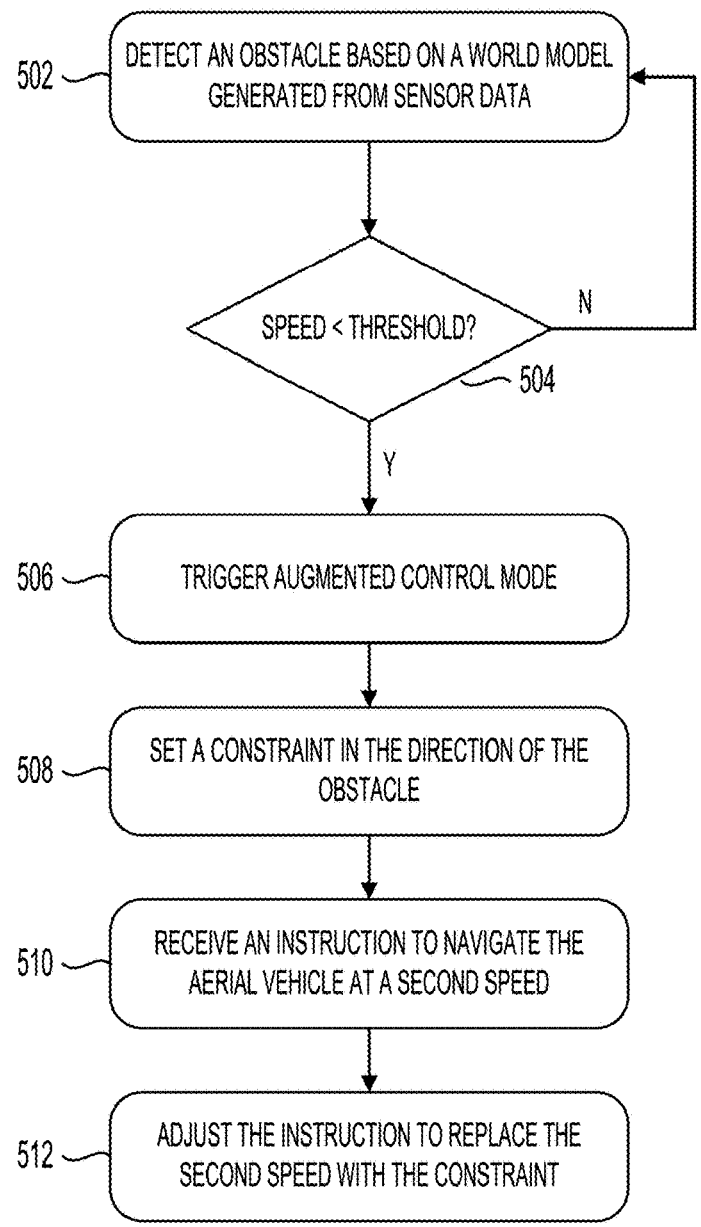
FIG. 5 illustrates a flow diagram of a method for controlling an aerial vehicle to avoid obstacles, in accordance with one or more implementations.

Referring now to FIG. 5, depicted is an illustrative flow diagram of a method 500 for controlling an aerial vehicle to avoid obstacles. The method 500 can be executed, performed, or otherwise carried out by the vehicle management system 110, the computer system 600 described herein in conjunction with FIG. 6, or any other computing devices described herein. The method can include detecting an obstacle for an aerial vehicle based on a world model generated from sensor data (STEP 502), determining whether a speed of the aerial vehicle is less than a predetermined threshold (STEP 504), triggering an augmented manual control mode (STEP 506), setting a constraint for the aerial vehicle in the direction of the obstacle (STEP 508), receiving an instruction to navigate the aerial vehicle at a second speed (STEP 510), and adjusting the instruction to replace the second speed with the speed constraint (STEP 512).

At STEP 502, the vehicle management system can detect, based on a world model generated from sensor data captured by one or more sensors positioned on the aerial vehicle during flight, an obstacle for the aerial vehicle. As described herein, the one or more sensors can include one or more of a LiDAR sensor, a radar sensor, or a camera. The sensor data captured by the sensors may be used to generate a world model, which may include generating one or more distance fields, such as the example distance field represented in the plot shown in FIG. 4A. A distance field can be a multidimensional field where a value at each point is equal to a distance from a particular obstacle. Gradients in a distance field may be used to determine a direction to the obstacle relative to the aerial vehicle. Using the sensor data, such as proximity sensors, cameras, or LiDAR sensors, the vehicle detects one or more obstacles in the environment as the aerial vehicle is operated. In some implementations, multiple objects may be detected. In such implementations, multiple directions between each of the obstacles relative to the obstacles may be determined. For example, using the position of the aerial vehicle in the world model, and the determined position of the aerial vehicle in the world model, the vehicle management system can calculate a direction of a vector in three-dimensional space (e.g., using Euclidean vector functions) from the aerial vehicle to the position of the object. In some implementations, the vehicle management system can calculate the direction based on one or more gradients in a distance field. The distance from the aerial vehicle to the detected objects can be calculated using similar operations.

At STEP 504, the vehicle management system can determine whether a speed of the aerial vehicle is less than a predetermined threshold. The techniques described herein may operate when the aerial vehicle is navigating at less than a predetermined speed. The predetermined speed may be based on the capabilities of the aerial vehicle (e.g., the top speed, maneuverability, turn coordination speed limit, etc.). To determine whether the speed of the aerial vehicle is less than the threshold, the vehicle management system can access one or more vehicle sensor readings that provide vehicle status information, such as aerial vehicle acceleration and aerial vehicle speed, among others. The vehicle management system can compare the current speed of the aerial vehicle to the predetermined threshold. If the speed of the aerial vehicle is less than the predetermined threshold, the method can proceed to STEP 506. Otherwise, if the speed of the aerial vehicle is not less than the predetermined threshold, the method can return to STEP 502 of the method.

At STEP 506, the vehicle management system can trigger an augmented manual control mode responsive to the speed of the aerial vehicle being less than the predetermined threshold and detecting the obstacle. The augmented manual control mode can be a configuration setting of the vehicle management system that indicates that the vehicle management system can perform the techniques described herein to limit the maneuverability of the aerial vehicle while operating close to obstacles in the environment. To trigger the augmented manual control mode, the vehicle management system can modify a data structure in the memory of the vehicle management system that indicates the augmented control mode is enabled. The augmented manual control mode, if triggered, can cause the vehicle management system to perform the further steps of the method 500. As described herein, the augmented manual control mode can limit pilot-input changes to speed, attitude (e.g., roll, pitch, yaw), attitude rate, or vertical acceleration of the aerial vehicle in the direction of obstacles in the environment (e.g., the constraints 155). In some implementations, if the speed of the vehicle exceeds the predetermined threshold, the vehicle management system can deactivate the augmented manual control mode by modifying the data structure in the memory of the vehicle management system. In some implementations, the augmented manual control mode may be enabled during any operation of the aerial vehicle, and does not need to be triggered or activated. Once the augmented manual control mode is enabled, the vehicle management system can perform STEP 508 of the method 500. In some implementations, the vehicle management system may perform further steps of the method 500 without triggering the augmented manual control mode, for example, if the augmented manual control mode may be active by default, regardless of speed.

At STEP 508, the vehicle management system can set, responsive to triggering the augmented manual control mode, a speed constraint (e.g., a constraint 155) for the aerial vehicle in a direction of the obstacle based on a distance between the aerial vehicle and the obstacle. The speed constraint may be stored in one or more data structures in the memory of the vehicle management system (e.g., the constraints 155, etc.). As described herein, the vehicle management system can detect both a distance between detected objects in the environment and the aerial vehicle and a direction that, if traveled by the aerial vehicle, would result in a collision between the aerial vehicle and the obstacle. The vehicle management system may detect multiple obstacles in the environment from the world model, and subsequently set multiple constraints (e.g., one or more constraints for each obstacle) for the aerial vehicle.

The constraints may be set by identifying one or more control limits for movement of the aerial vehicle, and subsequently setting a constraint for those control limits. For example, if the constraint is a speed constraint, the vehicle management system can set corresponding speed constraints for the aerial vehicle in the direction of the obstacle. To set a constraint for the aerial vehicle, the vehicle management system can apply a function, such as an exponential function or another type of function, to the distance between the aerial vehicle and the obstacle. This function can be a function having an output that decreases exponentially as the distance between the obstacle and the aerial vehicle also decreases. Similarly, the function may also use the current orientation (e.g., angle or attitude of the aerial vehicle) as input, such that the output of the function also decreases as the angle to the obstacle decreases.

An example plot of such a function for a maximum roll/pitch constraint for the aerial vehicle is shown in FIG. 4B. As shown in FIG. 4B, when the angle of the aerial vehicle to the obstacle or the distance between the aerial vehicle to the obstacle decreases, the maximum allowable limit (e.g., the constraint) also decreases in value. Although this plot is shown for a pitch/roll constraint, it should be understood that such constraints may be generated using similar functions with similar limits for the speed, attitude, attitude rate, vertical acceleration, or component vectors thereof. The parameters (e.g., weights, coefficients, etc.) of the function used to calculate the constraint may be selected based on capabilities of the aerial vehicle. For example, different aerial vehicles with different maneuvers or abilities may utilize different functions, which may be predetermined or selected to optimize the safety of the aerial vehicle while navigating close to obstacles in the environment. The vehicle management system can set the constraint for the speed, attitude, attitude rate, or vertical acceleration of the aerial vehicle by providing the distance and attitude of the aerial vehicle into the function to generate a constraint value. Then, the aerial vehicle can update one or more data structures in the memory of the vehicle management system with the constraint value, which can be stored in association with the corresponding direction. Then, when the aerial vehicle receives a command to navigate in the direction (or partially along the direction), the vehicle management system can utilize the constraint to limit the movement of the aerial vehicle according to the constraint to maintain a safe distance between the aerial vehicle and the detected obstacle.

In some implementations, the vehicle management system can decompose the direction vector to the obstacle from the aerial vehicle into component (e.g. x, y, and z vectors) vectors, and set a corresponding speed constraint for the aerial vehicle in the direction of each component vector. The direction from the aerial vehicle to the obstacle can be represented in an inertial coordinate frame (e.g., along track, cross-track, etc.). However, the constraints for the aerial vehicle are represented in the body frame of reference (e.g., the frame of reference relative to the aerial vehicle). Therefore, in some implementations, the vehicle management system can transform the inertial frame of reference to the vehicle frame of reference to calculate the proper component constraint for each corresponding body axis of the aerial vehicle. Similar decomposition techniques may be utilized for the attitude of the aerial vehicle, by decomposing the direction into corresponding roll, pitch, and yaw rotation of the aerial vehicle. Corresponding constraints can then be set for each of the component roll, pitch, and yaw rotations, according to the constraint value calculated based on the distance or angle of the aerial vehicle to the obstacle. In some implementations, the aerial vehicle may set a stop constraint for an obstacle if the vehicle management system determines that the aerial vehicle is within a predetermined distance of the obstacle. For example, if the aerial vehicle is within the predetermined distance of the obstacle, the vehicle management system can set a constraint to prevent movement of the aerial vehicle in the direction of the obstacle.

In some implementations, upon setting a constraint for the aerial vehicle, the vehicle management system can provide an alert to the pilot. The alert can be provided using any suitable alert device, such as an audio alert device, a visual alert device, or another device present in the aerial vehicle, such as a display device (e.g., the display device 130). In some implementations, the alert may be haptic feedback created by sending a signal to an actuator in the vehicle control devices of the aerial vehicle. The intensity of the haptic feedback, or the alerts described herein, may be proportional to the amount by which the movement of the aerial vehicle is constrained. The alerts may be provided to the pilot when instructions are adjusted by the vehicle management system or when one or more constraints are set.

At STEP 510, the vehicle management system can receive, via an inceptor (e.g., a vehicle control device 135) of the aerial vehicle, an instruction to navigate the aerial vehicle in the direction at a second speed greater than the speed constraint. As the vehicle management system updates constraints for the aerial vehicle, the pilot of the aerial vehicle can send instructions to navigate the aerial vehicle close to obstacles in the environment. As described herein, the vehicle control devices can be used by a pilot to send instructions to navigate the aerial vehicle at different speeds, different attitudes, or different vertical accelerations. The instructions provided by the vehicle control devices can be received by the vehicle management system via one or more communications interfaces, and subsequently applied to the constraints. For example, if the vehicle management system determines that a constraint has been set for a particular direction toward which the pilot is attempting to maneuver the aerial vehicle, the vehicle management system can proceed to execute STEP 512 to adjust the instruction according to the corresponding constraint. If no constraints are set, or if the aerial vehicle is navigated in a direction that is not associated with a constraint, the vehicle management system can maneuver the aerial vehicle according to the instruction without adjustment. These techniques therefore allow the pilot to maintain manual control over the aerial vehicle, while having the flexibility to safely navigate the aerial vehicle close to obstacles without significant effort.

At STEP 512, the vehicle management system can adjust the instruction to replace the second speed with the speed constraint, to cause the aerial vehicle to navigate in the direction at the speed constraint instead of the second speed. As described herein, the vehicle control devices (e.g., the vehicle control devices 135) of the aerial vehicle can be operated by a pilot to provide one or more maneuver instructions to the aerial vehicle. Some examples of the maneuver instructions include a change to a speed of the aerial vehicle in a specified direction, a change in orientation (e.g., attitude) of the aerial vehicle, a change in attitude rate, or a change in vertical acceleration of the aerial vehicle. The instructions can be provided to the vehicle management system, which can determine whether the instruction should be modified according to one or more constraints. The vehicle management system can access one or more data structures in the memory of the vehicle management system to determine whether any constraints are set. If a constraint is set, the vehicle management system can compare the instructions received from the vehicle control devices to the limitations imposed in the constraint. If the vehicle management system determines that instruction exceeds the constraint (e.g., whether a speed instruction in a particular direction exceeds the speed constraint in that direction, etc.), the vehicle management system can replace the speed in the instruction along the direction with the speed constraint.

In some implementations, the vehicle management system can limit instructions according to more than one constraint. The vehicle management system can adjust constraints in multiple directions, for example, to navigate the aerial vehicle between two detected obstacles. Similarly, the vehicle management system can simultaneously adjust instructions to limit both rotation changes (e.g., attitude changes) and speed changes in the same instruction. In some implementations, the vehicle management system can generate and provide one or more signals to a vehicle control device, such as an inceptor of the aerial vehicle, that limit physical movement of the inceptor based on the speed constraint. The signal can be provided to an actuator of the vehicle control device that limits the movement the vehicle control device in the direction of the constraint. Constraints to changes in the attitude of the aerial vehicle or vertical acceleration of the vehicle can be used by the vehicle management system to adjust maneuver instructions, by replacing the corresponding attitude or vertical acceleration changes with corresponding constraint values when the instruction exceeds the value specified in the constraint. In some implementations, the vehicle management system can replace decomposed portions of movement instructions, such as x, y, or z axis movement, or roll, yaw, or pitch rotation, with corresponding decomposed constraint values, as described herein. When constraints are updated by the vehicle management system as the aerial vehicle navigates the environment, the vehicle management system can update the amounts by which instructions are adjusted, allowing the aerial vehicle to be safely navigated by a pilot near obstacles while conducting aerial tasks.

B. Computer System

Figure 6:
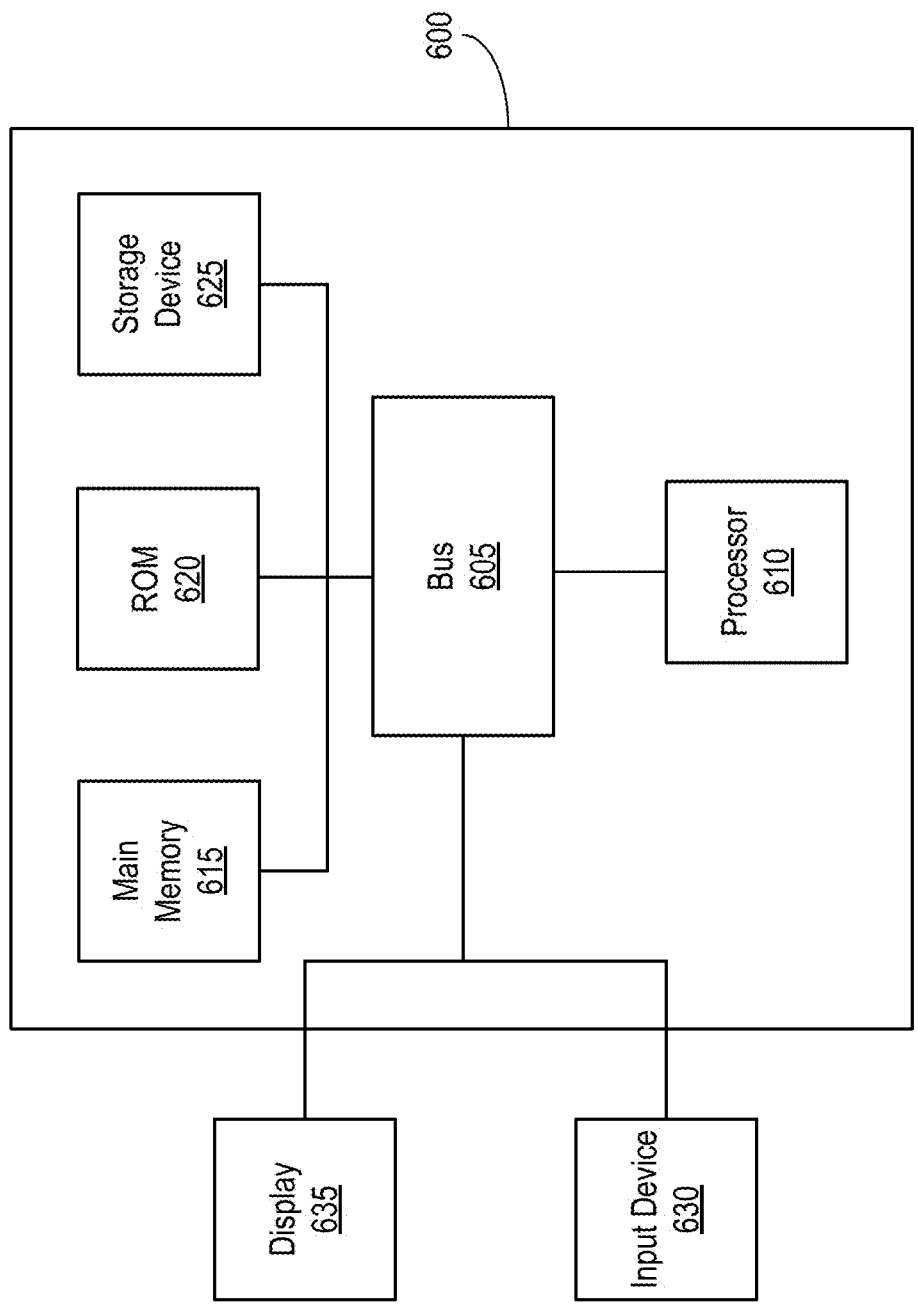
FIG. 6 illustrates a block diagram of an example computer system useful in implementing one or more components detailed herein.

Referring now to FIG. 6, depicted is a block diagram of an example computer system 600. The computer system or computing device 600 can include or be used to implement the system 100 or the system 200, or its components such as the vehicle management system 110. The computing system 600 includes at least one bus 605 or other communication component for communicating information and at least one processor 610 or processing circuit coupled to the bus 605 for processing information. The computing system 600 can also include one or more processors 610 or processing circuits coupled to the bus 605 for processing information. The computing system 600 also includes at least one main memory 615, such as a random access memory (RAM) or other dynamic storage device, coupled to the bus 605 for storing information, and instructions to be executed by the processor 610. The computing system 600 may further include at least one read only memory (ROM) 620 or other static storage device coupled to the bus 605 for storing static information and instructions for the processor 610. A storage device 625, such as a solid state device, magnetic disk, or optical disk, can be coupled to the bus 605 to persistently store information and instructions.

The computing system 600 may be coupled via the bus 605 to a display 635, such as a liquid crystal display, or active matrix display, for displaying information to a user such as an administrator of the data processing system. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635. The display 635 can be part of the display devices 130, or other components of FIG. 1.

The processes, systems, and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Although an example computing system has been described in FIG. 6, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein may be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for controlling an aerial vehicle to avoid obstacles, comprising:
    generating, by one or more processors coupled to memory of the aerial vehicle, using sensor data captured by one or more sensors of the aerial vehicle, a multi-dimensional distance field comprising a plurality of coordinates, each coordinate of the plurality of coordinates having a distance value indicating a distance between the aerial vehicle and an obstacle;
    detecting, by the one or more processors, based on the multi-dimensional distance field, the obstacle for the aerial vehicle;
    triggering, by the one or more processors, an augmented manual control mode responsive to a speed of the aerial vehicle being less than a predetermined threshold and detecting the obstacle;
    determining, by the one or more processors responsive to triggering the augmented manual control mode, a speed constraint for the aerial vehicle in a direction of the obstacle derived from at least one gradient of the multi-dimensional distance field, the speed constraint determined based on a turn coordination speed limit of the aerial vehicle and a distance between the aerial vehicle and the obstacle;
    receiving, by the one or more processors via an inceptor of the aerial vehicle, an instruction to navigate the aerial vehicle in the direction at a second speed greater than the speed constraint; and
    adjusting, by the one or more processors, the instruction to replace the second speed with the speed constraint, to cause the aerial vehicle to navigate in the direction at the speed constraint instead of the second speed.

2. The method of claim 1, wherein the one or more sensors comprise one or more of a light detection and ranging (LiDAR) sensor, a radar sensor, or a camera.

3. The method of claim 1, wherein the obstacle is a first obstacle, and further comprising:
    detecting, by the one or more processors, a second obstacle for the aerial vehicle in a second direction that is at least partially opposite the direction; and
    adjusting, by the one or more processors, a second instruction received via the inceptor of the aerial vehicle to limit a third speed for the aerial vehicle in the second direction, to guide the aerial vehicle between the first obstacle and the second obstacle.

4. The method of claim 1, further comprising:
determining, by the one or more processors, that the distance is less than a predetermined distance threshold; and
setting, by the one or more processors, the speed constraint to prevent movement in the direction responsive to determining that the distance is less than the predetermined distance threshold.

5. The method of claim 1, further comprising providing, by the one or more processors, an alert to a pilot of the aerial vehicle responsive to setting the speed constraint, wherein the alert is at least one of haptic feedback, an audio alert, or a visual alert presented on a display of the aerial vehicle.

6. The method of claim 1, further comprising adjusting, by the one or more processors, an inceptor constraint to limit physical movement of the inceptor based on the speed constraint.

7. The method of claim 1, further comprising:
setting, by the one or more processors responsive to triggering the augmented manual control mode, an attitude constraint for the aerial vehicle based on the direction to the obstacle and the distance; and
adjusting, by the one or more processors responsive to receiving a second instruction to change an attitude of the aerial vehicle, the second instruction to replace the change of the attitude with the attitude constraint.

8. The method of claim 1, further comprising:
setting, by the one or more processors responsive to triggering the augmented manual control mode, a vertical acceleration constraint for the aerial vehicle based on the direction to the obstacle and the distance; and
adjusting, by the one or more processors responsive to receiving a second instruction to change a vertical acceleration of the aerial vehicle, the second instruction to replace the change of the vertical acceleration with the vertical acceleration constraint.

9. The method of claim 1, wherein determining the speed constraint for the aerial vehicle further comprises determining, by the one or more processors, a respective speed constraint for each of an x-axis direction, a y-axis direction, and a z-axis direction.

10. A system for controlling an aerial vehicle to avoid obstacles, comprising:
one or more processors coupled to memory of the aerial vehicle, the one or more processors configured to:
generate, using sensor data captured by one or more sensors of the aerial vehicle, a multi-dimensional distance field comprising a plurality of coordinates, each coordinate of the plurality of coordinates having a distance value indicating a distance between the aerial vehicle and an obstacle;
detect, based on the multi-dimensional distance field, the obstacle for the aerial vehicle;
trigger an augmented manual control mode responsive to a speed of the aerial vehicle being less than a predetermined threshold and detecting the obstacle;
determine, responsive to triggering the augmented manual control mode, a speed constraint for the aerial vehicle in a direction of the obstacle derived from at least one gradient of the multi-dimensional distance field, the speed constraint determined based on a turn coordination speed limit of the aerial vehicle and a distance between the aerial vehicle and the obstacle;
receive, via an inceptor of the aerial vehicle, an instruction to navigate the aerial vehicle in the direction at a second speed greater than the speed constraint; and
adjust the instruction to replace the second speed with the speed constraint, to cause the aerial vehicle to navigate in the direction at the speed constraint instead of the second speed.

11. The system of claim 10, wherein the one or more sensors comprise one or more of a light detection and ranging (LiDAR) sensor, a radar sensor, or a camera.

12. The system of claim 10, wherein the obstacle is an first obstacle, and the one or more processors are further configured to:
detect a second obstacle for the aerial vehicle in a second direction that is at least partially opposite the direction; and
adjust a second instruction received via the inceptor of the aerial vehicle to limit a third speed for the aerial vehicle in the second direction, to guide the aerial vehicle between the first obstacle and the second obstacle.

13. The system of claim 10, wherein the one or more processors are further configured to:
determine that the distance is less than a predetermined distance threshold; and
set the speed constraint to prevent movement in the direction responsive to determining that the distance is less than the predetermined distance threshold.

14. The system of claim 10, wherein the one or more processors are further configured to provide an alert to a pilot of the aerial vehicle responsive to setting the speed constraint, wherein the alert is at least one of haptic feedback, an audio alert, or a visual alert presented on a display of the aerial vehicle.

15. The system of claim 10, wherein the one or more processors are further configured to adjust an inceptor constraint to limit physical movement of the inceptor based on the speed constraint.

16. The system of claim 10, wherein the one or more processors are further configured to:
set, responsive to triggering the augmented manual control mode, an attitude constraint for the aerial vehicle based on the direction to the obstacle and the distance; and
adjust, responsive to receiving a second instruction to change an attitude of the aerial vehicle, the second instruction to replace the change of the attitude with the attitude constraint.

17. The system of claim 10, wherein the one or more processors are further configured to:
set, responsive to triggering the augmented manual control mode, a vertical acceleration constraint for the aerial vehicle based on the direction to the obstacle and the distance; and
adjust, responsive to receiving a second instruction to change a vertical acceleration of the aerial vehicle, the second instruction to replace the change of the vertical acceleration with the vertical acceleration constraint.

18. The system of claim 10, wherein the one or more processors are further configured to determine the speed constraint for the aerial vehicle by determining a respective speed constraint for each of an x-axis direction, a y-axis direction, and a z-axis direction.

* * * * *